(12) United States Patent
Drowley et al.

(10) Patent No.: US 6,777,662 B2
(45) Date of Patent: Aug. 17, 2004

(54) SYSTEM, CIRCUIT AND METHOD PROVIDING A DYNAMIC RANGE PIXEL CELL WITH BLOOMING PROTECTION

(75) Inventors: Clifford I. Drowley, Scottsdale, AZ (US); Shrinath Ramaswami, Gilbert, AZ (US)

(73) Assignee: FreeScale Semiconductor, Inc., Austin, TX (US)

( * ) Notice: Subject to any disclaimer, the term of this patent is extended or adjusted under 35 U.S.C. 154(b) by 38 days.

(21) Appl. No.: 10/208,217

(22) Filed: Jul. 30, 2002

(65) Prior Publication Data

US 2004/0021058 A1 Feb. 5, 2004

(51) Int. Cl.[7] ............................................... H01L 27/00
(52) U.S. Cl. ............................... 250/208.1; 250/214 R
(58) Field of Search ..................... 250/208.1, 214 R, 250/214 C; 348/314, 297, 298, 308; 257/290, 291, 440

(56) References Cited

U.S. PATENT DOCUMENTS

| | | |
|---|---|---|
| 4,734,587 A | 3/1988 | Schwarte |
| 4,737,624 A | 4/1988 | Schwarte |
| 4,849,644 A | 7/1989 | Mira et al. |
| 5,523,835 A | 6/1996 | Tanaka |
| 5,600,696 A | 2/1997 | Sauer |
| 5,841,126 A | 11/1998 | Fossum et al. |
| 6,040,570 A | 3/2000 | Levine et al. |
| 6,088,085 A | 7/2000 | Wetteborn |
| 6,137,566 A | 10/2000 | Leonard et al. |
| 6,317,154 B2 | 11/2001 | Beiley |
| 6,323,942 B1 | 11/2001 | Bamji |
| 6,532,040 B1 * | 3/2003 | Kozlowski et al. .......... 348/241 |
| 2001/0024271 A1 | 9/2001 | Takayanagi et al. |

FOREIGN PATENT DOCUMENTS

| | | |
|---|---|---|
| WO | WO 98/10255 | 3/1998 |
| WO | WO 99/60629 | 11/1999 |
| WO | WO 00/52765 | 9/2000 |

OTHER PUBLICATIONS

A 256 X 256 CMOS Imaging Array w/Wide Dynamic . . . Dec. 1998.

* cited by examiner

Primary Examiner—Que T. Le
(74) Attorney, Agent, or Firm—Toler, Larson & Abel, LLP (57) ABSTRACT

An extended dynamic range pixel cell providing blooming protection is disclosed herein. By applying a timed varying signal to a shunt transistor in order to shunt excess charge generated by a photosensor in response to high intensity illumination, blooming protection can be provided. In particular configurations, blooming protection is provided not only during an integration period but also during a readout period when the pixel cell is generally most susceptible to blooming problems. The time varying voltage is also used to extend the dynamic range of the pixel cell thereby increasing the pixel cells usefulness in high contrast conditions, such as bright sunlight casting deep shadows, nighttime automotive applications, and the like.

76 Claims, 5 Drawing Sheets

-PRIOR ART-

SYSTEM, CIRCUIT AND METHOD PROVIDING A DYNAMIC RANGE PIXEL CELL WITH BLOOMING PROTECTION

CO-PENDING APPLICATIONS

This application is related to U.S. application Ser. No. 10/208,212, entitled "PIXEL SENSOR CIRCUIT DEVICE AND METHOD THEREOF", filed on even date herewith.

FIELD OF THE DISCLOSURE

This invention relates generally to photo-sensitive circuits, and more particularly to photo sensitive circuits used in pixel cells.

BACKGROUND

Most commercial complementary metal oxide semiconductor (CMOS) photo-sensors have a roughly linear response to incident light until the sensor reaches saturation, after which time any further conversion of light photons into electric charge exceeds the storage capacity of the photo-sensor. The linear range of CMOS photo-sensors commonly extends over about three orders of magnitude, or about 60 dB. Such a response range is suitable for high, "flat" illumination conditions such as video conferencing, video recording, or some conventional, still-camera imaging applications. However, in some applications, the linear response provided by many CMOS photo-sensors is not the most desirable.

For example, a linear response is usually undesirable in applications requiring a high dynamic range. The term "high dynamic range" refers to conditions under which there is a large variation of light intensity within a single scene. Bright, sunny days are one example of a high dynamic range condition under which the linear output of many CMOS photo-sensors is less than ideal, because objects cast deep shadows, and it is difficult for conventional CMOS photo-sensors to provide the desired level of detail in both the shadowed areas and in the brightly lit areas. Other situations in which the linear output of conventional CMOS photo-sensors may not be desirable include low light machine imaging applications, surveillance, imaging of driving scenes at night, and similar situations.

In addition to having a limited dynamic range, conventional CMOS photo-sensors do not provide blooming protection for cases in which the photo-sensor continues to generate charge even after the photo-sensor is "full," and no additional charge can be stored. In photo-sensors without blooming protection, excess charge generated by a photo-sensor "blooms," or leaks to nearby circuitry, including other image sensors/pixel cells, and causes degradation of the image output.

In order to achieve a wider response to incident light, some pixel cells have been constructed to extend the dynamic range of a pixel cell by biasing a transistor connected to the output of a photodiode in the subthreshold region using a fixed control voltage. By biasing the output transistor in the sub threshold region, a close approximation of a logarithmic response to incident light can be achieved. This approach can extend the dynamic range of the pixel cell, but since the response of the pixel cells is dependent on the barrier characteristics of the transistor used, and in addition the barrier characteristics can vary from cell to cell, such a method can introduce image noise.

Another method of increasing the dynamic range of a pixel cell includes applying a varying control voltage to the transistor, instead of biasing the transistor in the subthreshold region using a fixed voltage. While this is an improvement on the subthreshold bias method, without some sort of isolation of the photo-diode, the capacitance of the photo-diode has an adverse impact on the charge-to-voltage conversion of the pixel cell. In order to provide photo-diode isolation, an additional transistor is interposed between the "range extension" transistor and the photo-diode.

Figure 1:
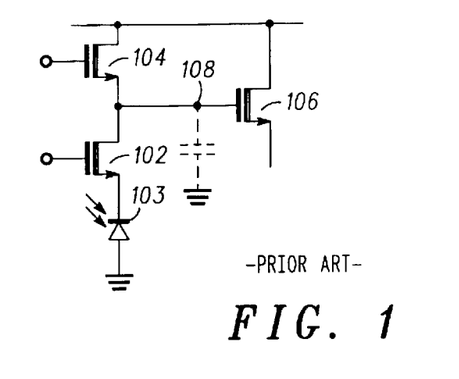
FIG. 1 is a schematic diagram of a prior an pixel cell.

Refer now to prior art FIG. 1, which will be referenced in discussing the "isolation" transistor. Transistor 104 is the "range extension" transistor, transistor 102 is the "isolation" transistor, and transistor 106 is used to drive the output of the pixel cell, which is represented by the charge stored in floating node 108. By biasing transistor 102 slightly "on," the capacitance of photodiode 103 can be isolated from storage node 108 during the time when charge is being generated by photo-diode 103 and stored in floating node 108. A time-varying signal is applied to the control gate of transistor 104 to achieve the desired extension of the pixel cell's dynamic range. During readout of the pixel cell, transistor 102 is turned off, so that the voltage at floating node 108 can be properly determined.

However, when transistor 102 is in the off state, photo-diode 103 continues to generate current in response to light. If the intensity of the light is sufficient to cause photodiode 103 to generate more charge than photodiode can store, then photodiode 103 will bloom, causing charge to be distributed to nearby circuit components. This occurs because transistor 102, when in the off state, prevents charge from leaving photodiode 103 after being generated. As a result, a circuit such as that illustrated in prior art FIG. 1 provides no blooming protection during a readout period of the pixel cell. What is needed, therefore, is a pixel cell that can provide both an extended range dynamic response and blooming protection.

BRIEF DESCRIPTION OF THE DRAWINGS

Various display objects, advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

FIGS. 2–10 illustrate the operation of an imaging system employing extended range pixel cells with blooming protection. By connecting a shunt transistor between a voltage source and a photo-sensor, excess charge generated by the photo-sensor can be shunted to a voltage source thereby preventing excess charge from bleeding into nearby circuitry. In addition, by applying a time varying control voltage to the shunt transistor the response of the pixel cell can be extended across a wider range of illumination intensities. In other embodiments, the time varying voltage may also be applied to a control node of a reset transistor in order to provide dynamic range extension. Some embodiments illustrated in FIGS. 2–10 provide for operation in multiple modes, including operation in a subthreshold bias mode, a double correlated sampling mode, and a reverse correlated double sample mode. The pixel cells and system discussed herein can be used to provide blooming protection during all phases of the imaging process, including during image capture or integration, and during pixel cell readout.

Figure 2:
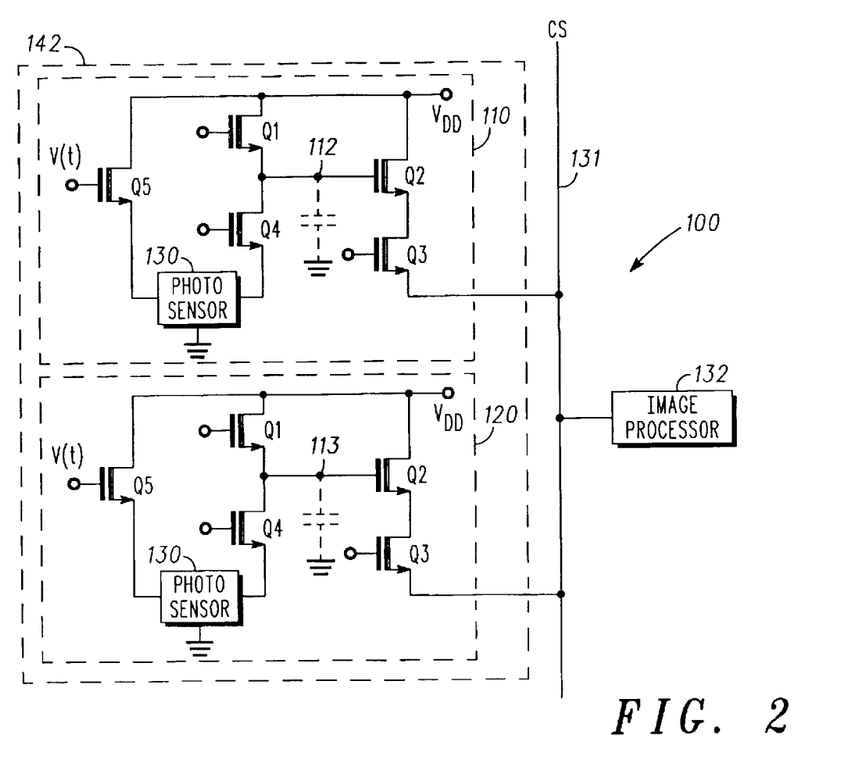
FIG. 2 is a diagram of an imaging system including an array of pixel cells according to one embodiment of the present invention.

Referring first to FIG. 2, an imaging system including an array of pixel cells will be discussed according to an embodiment of the present invention, and designated generally imaging system 100. Imaging system 100 includes pixel array 142 and image processor 132. Image processor 132 is, in at least one embodiment, a standard information processor such as those found in digital cameras, scanners, digital movie recorders, and other similar devices. Imaging system 100 also includes pixel array 142, which includes a plurality of pixels such as pixel cell 110 and pixel cell 120, which generate and collect charge representing one pixel of a larger image in response to light striking a photo-sensitive element, such as photo-sensor 130. The charge stored in pixel cells 110 and 120 may be read out by using a row select transistor, such as transistor Q3 in combination with a column select line such as column select line 131, to select the appropriate pixel cell and provide the charge stored in the selected pixel cell to image processor 132. Image processor 132 receives the output of pixel cells 110 and 120, and processes the outputs into a composite image based, at least in part, on the amount of charged stored in floating node 112 of each pixel cell.

The operation of a pixel cell will be described with reference to pixel cell 110. Charge is stored in pixel cell 110 during an integration period. This stored charge represents a single picture element of a composite image, and is generated by photosensor 130, which responds to light by generating an amount of charge related to the intensity of incident light with which photosensor 130 is illuminated. Transistors Q1, Q4 and Q5 are placed in conductive states to precharge floating node 112 and deplete photosensor 130. Transistor Q4 is then placed in a non-conductive state to allow photosensor 130 to accumulate charge during an integration period. During the integration period, a varying control voltage V(t) is applied to a shunt transistor Q5 in order to extend the dynamic range of pixel cell 110. At the completion of the integration period, the voltage on floating node 112 is read out as a reference. Next, transistor Q4 is turned on to allow charge accumulated by photosensor 130 to be transferred from photosensor 130 to floating node 112, and the voltage on floating node 112 is read out a second time The charge stored in floating node 112 is read out by turning on transistor Q3 in combination with column select line 131. The voltage placed on column select line 131 in response to the charge stored in pixel cell 110 is read by image processor 132, which processes individual pixels into a composite image. It will be appreciated that the operation of pixel cell 120 is analogous to that of pixel cell 110. The operation of a pixel cell will be described in greater detail with relation to subsequent figures.

Figure 3:
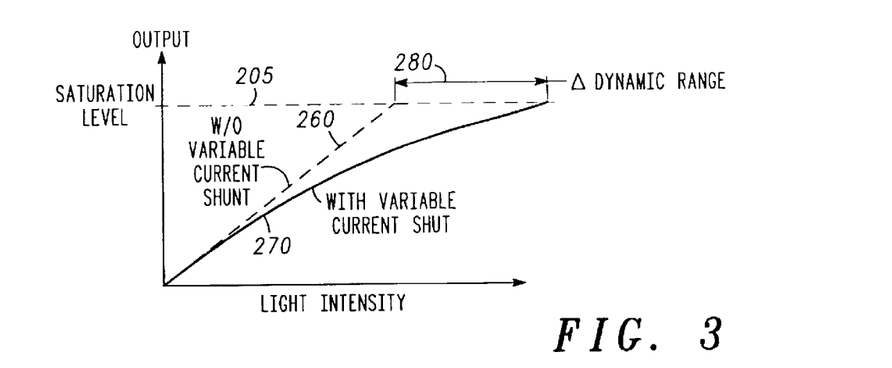
FIG. 3 is a graph illustrating the change in dynamic range achieved by using a variable control voltage according to one embodiment of the present invention.

Referring next to FIG. 3, the change in dynamic range achieved by using a time varying control voltage on the control node of a shunt transistor, such as shunt transistor Q5 (FIG. 2), will be discussed. Note that the graph illustrated in FIG. 3 plots light intensity striking the photodiode or other photosensor, against the output level of a pixel cell, which generally corresponds to the charge stored on floating nodes 112 and 113 (FIG. 2). Non-shunt output 260 illustrates the output of a pixel cell that does not employ a time varying signal on the control node of a shunt transistor. Note that the non-shunt output 260 is essentially linear until it reaches saturation level 205. At the point where non-shunt output 260 reaches saturation level 205, any additional charge generated by the photosensor will not be stored in the floating node, but will instead "bloom," or leak, to nearby circuitry. Note that extended range output 270 is non-linear, and detail in an image can be detected over a wider range of light intensities would be otherwise possible with non-shunt output 260. The difference between the range capability of extended range output 270, which is achieved by applying a time varying voltage to a control node of a transistor, and non-shunt output 260, is shown by Δ dynamic range 280. As illustrated by FIG. 3, application of a time varying voltage to a control node of a shunt transistor can significantly increase the dynamic range of a pixel cell.

Figure 4:
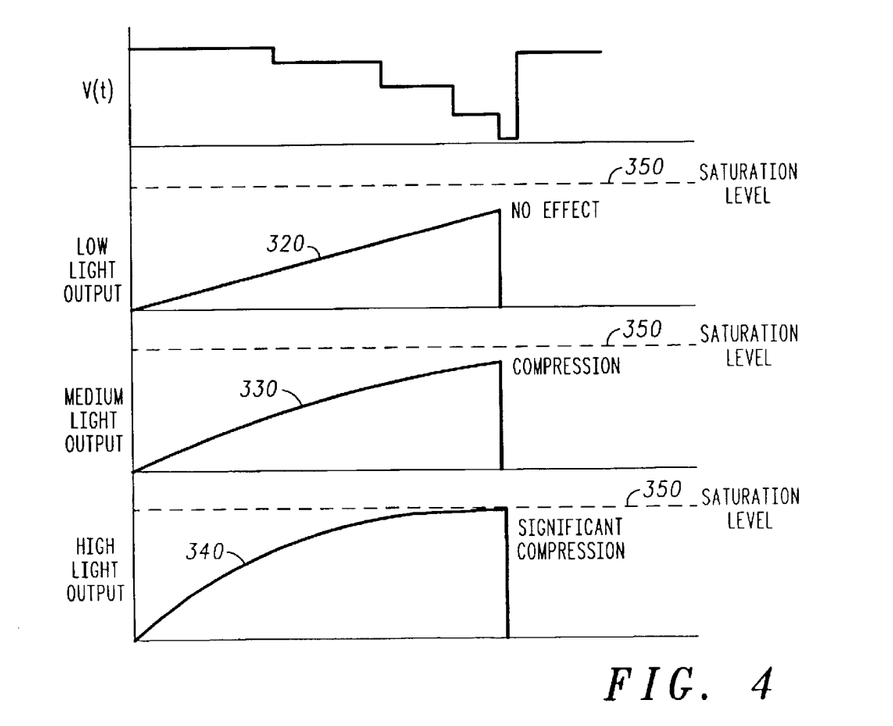
FIG. 4 is a series of graphs illustrating an output of a pixel cell under various lighting conditions when a varying control voltage is used according to an embodiment of the present invention.

Referring next to FIG. 4, a graph illustrating how the amount of charge stored in a photosensor under different lighting conditions is affected by applying a time varying control voltage V(t) to a shunt transistor. Low light output curve 320 shows that under low light conditions, when a time varying control signal V(t) is applied to a shunt transistor, there is effectively no difference in the amount of charge stored, nor is there any extension of the dynamic range of the pixel cell, as compared to the case where no variable signal V(t) was applied. This occurs because at low light levels the photosensor produces charge more slowly than at high levels of light intensity. Since the photosensor produces charge slowly, the shunt transistor is never biased to a conducting state, and charge is not shunted from the photosensor.

Medium light output curve 330 shows some amount of "compression." If medium light output curve 330 were not limited/compressed by the operation of a shunt transistor biased with a time varying control signal V(t), medium light output curve 330 might very well reach saturation level 350, as discussed in FIG. 3. However, by applying time varying voltage V(t) to the control node of a shunt transistor, if the charge on the photosensor builds up enough to forward bias the shunt transistor, some of the charge generated by the photosensor will be shunted away, thereby "compressing" the amount of charge stored for a particular light intensity. This "compression" of charge results in a corresponding expansion of the dynamic range of the pixel cell. Note that in the illustrated embodiment, V(t) changes more rapidly towards the end of the accumulation/integration period. By increasing the rate at which V(t) decreases, detail in low light areas can be maintained while higher intensity areas can be compressed to avoid saturation of the photosensor. High intensity light output curve 340 illustrates the case where very high intensity light illuminates the photosensor. In such a case, signification compression occurs since charge is being generated relatively rapidly by the photosensor, as compared to low light level conditions illustrated by low light output 320. As a result of this rapid charge generation, the voltage difference between the control node of the shunt transistor and the emitter of the shunt transistor changes rapidly enough to allow the shunt transistor to turn on sooner than in the medium light scenario, and to shunt a greater amount of current.

Figure 5:
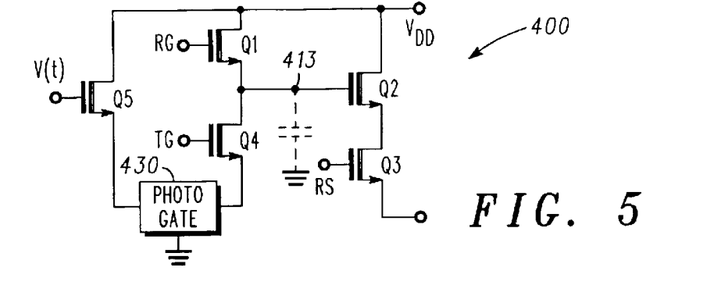
FIG. 5 is a schematic diagram of a pixel cell according to an embodiment of the present invention.

Referring next to FIG. 5, operation of a five transistor (5T) embodiment of a pixel cell designated generally as 5T pixel cell 400 will be discussed. 5T pixel cell 400 includes: shunt transistor Q5 having a second electrode coupled to voltage supply $V_{DD}$, a control node coupled to control signal V(t), and a first electrode coupled to a photosensor such as photogate 430; reset transistor Q1 having a control node coupled to reset gate control signal RG, a first electrode coupled to a floating node such as storage node 413, a second electrode coupled to voltage supply $V_{DD}$. Transfer transistor Q4 having a control node coupled to transfer gate control signal TG, a second electrode coupled to a floating node such as storage node 413, and a first electrode coupled to a photosensor such as photogate 430; a buffer transistor designated source follower Q2 having a control node coupled to storage node 413, a first electrode coupled to output transistor Q3, and a second electrode coupled to voltage supply $V_{DD}$, and output transistor Q3 having a first electrode coupled to an output of 5T pixel cell 400, a control node coupled to row select control signal RS, a second electrode coupled to the first electrode of source follower. transistor Q2. Source follower transistor Q2 drives the output of 5T pixel cell 400, with the charge stored at storage node 413 used as the bias voltage on the control node of source follower transistor Q2. Output transistor Q3 simply gates the output of 5T pixel cell 400 in response to receipt of a row select (RS) signal.

At the end of the integration, or image capture period, the amount of charge stored on storage node 413 is indicative of the intensity of light illuminating photogate 430. Initially reset gate Q1 is used to pre-charge storage node 413 to a high voltage during a pre-charge period. Also during this pre-charge period, shunt transistor Q5 is turned on to pre-charge photogate 430. After the pre-charge period, reset transistor Q1 is turned off, effectively isolating storage node 413 from voltage source $V_{DD}$ Transfer transistor Q4 is also in a non-conductive state at this time, so storage node 413 is isolated from photogate 430.

During the next phase, an integration phase, a time varying voltage V(t) is applied to shunt transistor Q5 while photogate 430 generates charge in response to being illuminated with light. The amount of charge stored by photogate 430 is controlled by the time varying voltage applied to shunt transistor Q5. V(t) is varied in the same way as discussed with reference to FIG. 4, so that the charge generated by photogate 430 is compressed for high intensity light conditions, and uncompressed for low light conditions. At the end of the accumulation/integration period, shunt transistor Q5 is turned off, thereby isolating the charge stored in photogate 430 from voltage source $V_{DD}$.

At this point 5T pixel cell 400 is ready to be accessed during a readout period. During the readout period, output transistor Q3 is strobed to allow the charge stored at storage node 413 to control the amount of current flowing through transistor Q2. Recall that the charge stored during this first in storage node 413 is the reference charge stored during the precharge phase. After the reference charge is read out, transfer transistor Q4 is turned on to allow the charge stored on photogate 430 to flow into storage node 413. Output gate Q3 is then strobed again and the new amount of charge stored in storage node 413, which represents the difference between the amount of charge stored during the pre-charge phase and the amount of charge generated by photogate 430 during the integration period is used to control the amount of current passing through transistor Q2 and on to the output of 5T pixel cell 400.

Figure 6:
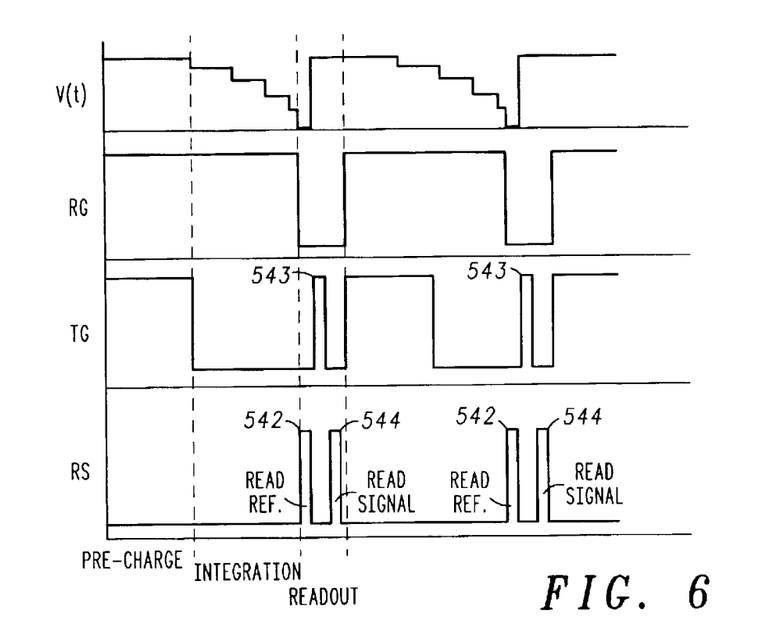
FIG. 6 is a timing diagram illustrating the operation of the pixel cell shown in FIG. 5, according to an embodiment of the present invention.

The operation of 5T pixel cell 400 may be more fully appreciated by referring to FIG. 5 along with FIG. 6, which is a timing diagram illustrating the operation of 5T pixel cell 400. The following description of operation assumes that light is shining on photogate 430, although a shutter may be used to control illumination timing. To initialize 5T pixel cell 400 reset transistor Q1, as well as transfer transistor Q4 and shunt transistor Q5, may be turned on to precharge the photosensor during an initialization/precharge phase. This initialization is performed by setting control voltages V(t), RG and TG high. In another embodiment, pre-charge of photogate 430 may be accomplished with shunt transistor Q5 alone, while reset transistor Q1 is turned on to pre-charge storage node 413. If transfer transistor Q4 is used during pre-charge, TG is set low at the end of the pre-charge period to turn off transfer transistor Q4 during the integration period. Reset gate Q1, which is controlled by reset gate control signal RG, remains on during the integration period.

During the integration period, V(t) is stepped down so that shunt transistor Q5 shunts a varying amount of charge from photogate 430 to voltage source $V_{DD}$, depending on the intensity of light striking photogate 430. This provides a time varying clamp on the voltage of photogate 430 as it discharges towards ground. After the desired integration period, if reset transistor Q1 has not been previously turned off by reset gate control signal RG, reset transistor Q1 is turned off at this time.

A reference sample of the output voltage can then be obtained by strobing output transistor Q3 using row select signal RS as indicated by strobe 542. Transfer transistor Q4 is then turned on briefly, as illustrated by strobe 543, to allow the charge in photogate 430 to be transferred to storage node 413. After the charge has been transferred from photogate 430 to storage node 413, transfer transistor Q4 is turned off again, and reset signal RS is strobed again, as shown by strobe 544, so that the output of output transistor Q3 now reflects the difference between the amount of charge stored in storage node 413 during the pre-charge period and the amount of charge generated by photogate 430 during the integration period. The difference between the reference charge stored in storage node 413 and the sum of the reference charge and the charge generated by photogate 430 can be used to generate a double correlated sample indicating the amount of charge generated by photogate 430 during the integration period, and therefore the intensity of light illuminating photogate 430.

Note that during the second portion of the readout period, time varying signal V(t) is set high to allow maximum transfer of charge between photogate 430 and voltage source $V_{DD}$. By turning shunt transistor Q5 on after the charge stored on photogate 430 has been transferred to storage node 413, shunt transistor Q5 provides blooming protection during the readout period. As a result, the 5T pixel cell 400 provides full anti-blooming clamp and double correlated sampling. In addition, the 5T pixel cell 400 can run as a convention cell by keeping V(t) turned off or by turning V(t) on only after charge is transferred to the floating node. Such a dual mode operation may be useful under variable illumination conditions such as encountered in automotive applications.

Figure 7:
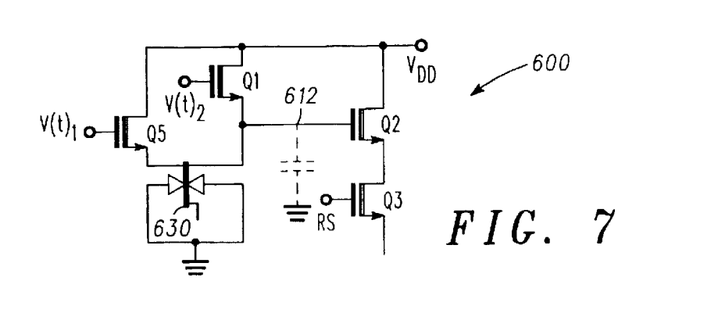
FIG. 7 is a schematic diagram of a pixel cell according to another embodiment of the present invention.

Referring next to FIG. 7, another embodiment of a pixel cell according to the present disclosure will be discussed and designated generally as 4T pixel cell 600. Like 5T pixel cell 400 (FIG. 5), 4T pixel cell 600 includes a storage node, such as storage node 612, source follower transistor Q2, output transistor Q3, reset transistor Q1 and shunt transistor Q5. In place of photogate 430 (FIG. 5), 4T pixel cell 600 uses pinned photodiode 630. Source follower transistor Q2 and output transistor Q3 operate identically to the same transistors discussed in relationship to 5T pixel cell 400 in FIG. 5. Likewise, storage node 612 serves the same purpose as storage node 413, by acting to store charge generated by a photosensor, such as pinned photodiode 630. In the illustrated embodiment, pinned diode 630 is targeted to be fully depleted at its operating voltage, so that parasitic capacitance is minimized. This design criterion allows maximum charge to voltage conversion on storage node 612.

In one mode of operation, 4T pixel cell 600 provides a variable voltage clamp. In this variable voltage clamp mode, voltage $V(t)_1$, is a time varying voltage that is applied as previously discussed with relation to other embodiments of the pixel cell disclosed herein, such that the dynamic range of 4T pixel cell 600 is increased by shunting a portion of the charge generated by pinned photodiode 630 to ground when pinned diode is exposed to high intensity light. Operating in the variable voltage clamp mode, voltage $V(t)_2$, which is applied to the control gate of reset transistor Q1, is set high during a pre-charge period to pre-charge 4T pixel cell 600. Voltage $V(t)_2$ is then turned off while voltage $V(t)_1$ is ramped or stepped downward in a time varying manner such that the clamp voltage decreases over time at an increasing rate. The time over which the clamp voltage decreases is the integration time, which coincides with the time over which charge is stored in storage node 612. At the end of the desired integration time, row select signal RS is strobed to the input of output transistor Q3 so that the charge stored in 4T pixel cell 600 is read out.

Figure 8:
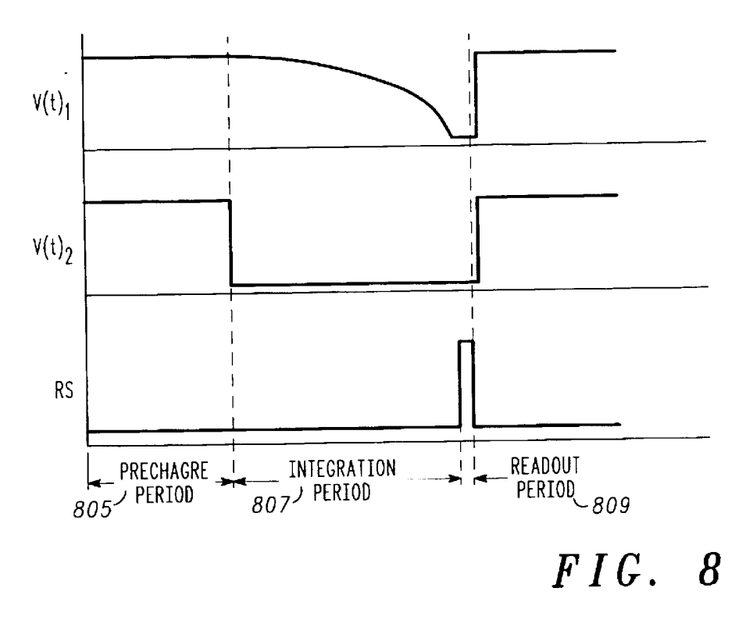
FIG. 8 is a timing diagram illustrating the operation of the pixel cell shown in FIG. 7 in response to a smoothly decreasing control voltage according to one embodiment of the present invention.

Referring now to FIGS. 7 and 8, a timing diagram illustrating the variable voltage clamp mode will be discussed. During pre-charge period 805, voltage $V(t)_1$, which supplies the bias voltage for shunt transistor Q5 is set high. By setting $V(t)_1$ high, shunt transistor Q5 will shunt a maximum amount of charge from pinned photodiode 630 to $V_{DD}$, and will deplete the pinned photodiode 630 to minimize parasitic capacitance. Also during pre-charge period 805, voltage $V(t)_2$ of reset transistor Q1 is set high so that a maximum amount of charge flows from storage node 612 to $V_{DD}$. By setting $V(t)_2$ to a maximum value storage node 612 is placed at about the same potential as $V_{DD}$. The potential of storage node 612 corresponds to the amount of charge stored, so that if storage node 612 is a placed at a positive potential there will be a shortage of negative charge elements in storage node 612.

Reset signal RS, which serves as the gate input to output transistor Q3, remains off during the precharge period 805. At the end of pre-charge period 805 and the beginning of integration period 807, $V(t)_2$ is set low to place reset transistor Q1 in a non-conducting state, thereby isolating storage node 612 from $V_{DD}$. At the same time, or shortly thereafter, voltage $V(t)_1$ is varied smoothly from a high value to a low value over integration period 807. As pinned photodiode 630 converts incident light into negative charge elements, the negative charge elements travel either to storage node 612, or if a sufficient number of negative charge elements are produced by pinned diode 630 to cause the voltage difference between the gate and the source of shunt transistor Q5 to forward bias shunt transistor Q5, then excess charge elements will flow to $V_{DD}$. Once enough charge has been shunted so that shunt transistor Q5 is no longer forward biased, the negative charge elements will flow once again to storage node 612.

Either at or near the end of integration period 807, and before $V(t)_2$ is raised high again, readout of storage node 612 is performed during readout period 809. During readout period 809, reset row select signal RS is strobed to turn on output transistor Q3 and read out the contents of 4T pixel cell 600 to external circuitry. Voltage $V(t)_1$ may be set at its minimum value towards the end of integration period 807 and/or during readout period 809 so that storage node 612 is completely isolated, and any charge stored on storage node 612 can be accurately readout from output transistor Q3. However, in order to provide some level of blooming protection, voltage $V(t)_1$ may be set to bias shunt transistor Q5 slightly on.

Figure 9:
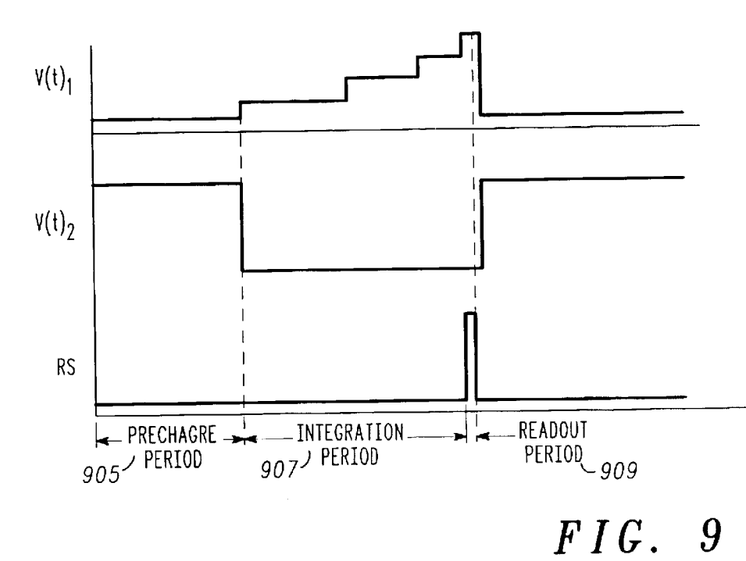
FIG. 9 is a timing diagram illustrating the operation of the pixel cell shown in FIG. 7 in response to a control voltage that is increased in discrete steps according to one embodiment of the present invention.

Note that in relation to FIG. 8, a smoothly decreasing waveform $V(t)_1$ was discussed. In other embodiments, however, $V(t)_1$ may be a stepped waveform instead of smoothly varying, and depending on the configuration of transistors used may be designed to increase over an integration period rather than decrease. A timing diagram for a pixel cell configured to use an increasing stepped variable waveform is illustrated in FIG. 9. During precharge period 905, row select signal RS is low indicating that no readout of charge stored in a floating node 612 is being performed. $V(t)_2$ is set high to forward biasing reset transistor Q1, and $V(t)_1$ is set low. During integration period 907 $V(t)_1$ the bias voltage input for shunt transistor Q5 is stepped from low to high while $V(t)_2$ is set low so that reset transistor Q1 is turned off and row select signal RS remains low. By stepping $V(t)_1$ from low to high over integration period 907 the output of a pixel cell, such as 4T pixel cell 600 can be used over a larger dynamic range than without varying voltage $V(t)_1$. During readout period 909, the output of storage node 612 is delivered to external circuitry by strobing row select signal RS.

Figure 10:
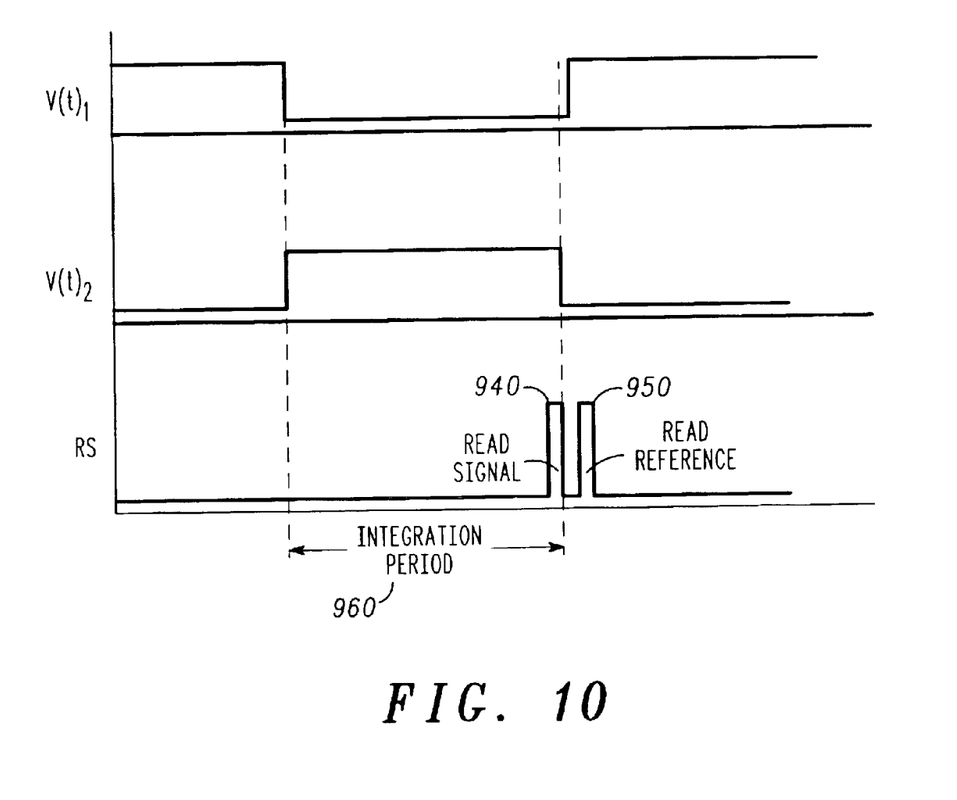
FIG. 10 is timing diagram illustrating the operation of the pixel cell shown in FIG. 7 in a subthreshold mode of operation according to another embodiment of the present invention.

Referring next to FIG. 10, another mode of operation of 4T pixel cell 600 as illustrated in FIG. 7 will be discussed according to an embodiment of the present invention. The illustrated mode of use involves biasing reset transistor Q1 in the sub-threshold region during integration period 960, such that the gate to source voltage of reset transistor Q1 is described by the equation $V_{GS} \square A \log I_{PH}$, where $I_{PH}$ is the photocurrent generated by a photosensor and A is a proportionality constant. In this mode, shunt transistor Q5 is biased initially on by setting $V(t)_1$ high, so that photocurrent flows through shunt transistor Q5. During the integration period 960, reset transistor Q1 is biased on in the sub threshold region by applying an intermediate voltage level $V(t)_2$ to the control gate of reset transistor Q1. Towards the end or at the end of integration period 960, row select RS is strobed such as illustrated by read signal strobe 940, $V(t)_2$ is then turned off and $V(t)_1$ is set high to turn on shunt transistor Q5 and provide a reference level for storage node 612. Row select signal RS is then strobed again as illustrated by read reference strobe 950. By using read signal strobe 940 and read reference strobe 950, 4T cell 600 may be used to produce a "reverse" double correlated sample.

In the preceding detailed description of the figures, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical, and electrical changes may be made without departing from the spirit or scope of the invention. For example, while the above discussion focuses primarily on the use of N-channel CMOS transistors, P channel CMOS transistors can he used with appropriate modifications in reference voltages and interpretation of output signals, MOS transistors may be used, as well as other suitable transistor types. In addition, although specific photosensor types have been discussed in particular embodiments above, various photosensors such as pinned photodiodes, photodiodes, photogates and the like may all be employed under proper circumstances in implementing the present disclosure. It has also been discussed, in particular examples above, that the voltage of a shunt transistor is varied with time such that excess charge generated by a photosensor is shunted to avoid blooming of the photosensor, and/or to provide an expanded dynamic range of a pixel cell.

Furthermore, many other varied embodiments that incorporate the teachings of the invention may be easily constructed by those skilled in the art. For example, the embodiments discussed above focus primarily on a pixel cell connected to a system employing an row and columns select access configuration. Other suitable access configurations may be used to readout charge stored by a pixel cell without departing from the spirit and scope of the present disclosure. To avoid detail not necessary to enable those skilled in the art to practice the invention, the description may omit certain information known to those skilled in the art. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A pixel cell comprising:
   a reset transistor, said reset transistor including:
      a control node to be coupled to a first control signal;
      a second current electrode to be coupled to a voltage supply; and
      a first current electrode coupled to a floating node;
   a buffer transistor, said buffer transistor including:
      a control node coupled to said floating node;
      a second current electrode to be coupled to said voltage supply; and
      a first current electrode coupled to a second current electrode of an output control transistor;
   a transfer transistor, said transfer transistor including:
      a control node to be coupled to a second control signal;
      a second current electrode coupled to said floating node; and
      a first current electrode to provide an input of a photosensor;
   a shunt transistor, said shunt transistor including:
      a control node to be coupled to a shunt control signal;
      a second current electrode coupled to be coupled to said voltage supply; and
      a first current electrode to be coupled to said input of said photosensor;
   a photosensor, said photosensor including:
      an input coupled to said first current electrode of said shunt transistor and to said first current electrode of said transfer transistor; and
      an output coupled to a voltage return.

2. The pixel cell as in claim 1, further including an output control transistor, said output control transistor including:
   a control node to be coupled to a readout control signal;
   a second current electrode coupled to said first current electrode of said buffer transistor; and
   a first current electrode to provide an output of said pixel cell.

3. The pixel cell as in claim 1, wherein said first control signal is a time-varying signal.

4. The pixel cell as in claim 1, wherein:
   said first control signal places said reset transistor in a conduction state during a pre-charging period; and
   said first control signal places said reset transistor in a non-conduction state after an integration period.

5. The pixel cell as in claim 1, wherein said second control signal places said transfer transistor in a conduction state during a pre-charging period.

6. The pixel cell as in claim 1, wherein said second control signal places said transfer transistor in a non-conduction state during an integration period.

7. The pixel cell as in claim 1, wherein:
   said second control signal places said transfer transistor in a conduction state to allow transfer of charge from said photosensor to said floating node during a transfer period; and
   said second control signal places said transfer transistor in a non-conduction state after said transfer period.

8. The pixel cell as in claim 1, wherein said shunt control signal is a time-varying signal.

9. The pixel cell as in claim 8, wherein said shunt control signal is decreased from a maximum value to a lesser value over an integration period.

10. The pixel cell as in claim 8, wherein said shunt control signal is varied in discrete steps.

11. The pixel cell as in claim 8, wherein said shunt control signal is varied smoothly.

12. The pixel cell as in claim 1, wherein said variable biasing signal places said shunt transistor in a conduction state during a readout period.

13. The pixel cell as in claim 1, wherein said photosensor is a photodiode.

14. The pixel cell as in claim 13, wherein said photodiode is a pinned photodiode.

15. The pixel cell as in claim 1, wherein said photosensor is a photogate.

16. A pixel cell comprising:
   a reset transistor, said reset transistor including:
      a control node to be coupled to a reset control signal;
      a second current electrode to be coupled to a voltage supply; and
      a first current electrode coupled to a floating node;
   a buffer transistor, said buffer transistor including:
      a control node coupled to said floating node;
      a second current electrode to be coupled to said voltage supply; and
      a first current electrode coupled to a second current electrode of an output control transistor;
   a shunt transistor, said shunt transistor including:

a control node to be coupled to a shunt control signal;
a second current electrode coupled to a voltage source; and
a source to be coupled to an input of a photosensor;
a photosensor, said photosensor including:
an input coupled to said first current electrode of said shunt transistor and to said floating node; and
an output coupled to a voltage return.

17. The pixel cell as in claim 16, further including an output control transistor, said output control transistor including:
a control node to be coupled to a readout control signal;
a second current electrode coupled to said first current electrode of said buffer transistor; and
a first current electrode to provide an output of said pixel cell.

18. The pixel cell as in claim 16, wherein said first control signal is a time-varying signal.

19. The pixel cell as in claim 16, wherein said first control signal places said reset transistor in a conduction state during a pre-charging period.

20. The pixel cell as in claim 16, wherein said first control signal places said reset transistor in a non-conduction state during an integration period.

21. The pixel cell as in claim 16, wherein said first control signal biases said reset transistor in a subthreshold region during an integration period.

22. The pixel cell as in claim 16, wherein said shunt control signal is a time-varying signal.

23. The pixel cell as in claim 22, wherein said shunt control signal is decreased from a maximum value to a lesser value over an integration period.

24. The pixel cell as in claim 22, wherein said shunt control signal is varied in discrete steps.

25. The pixel cell as in claim 22, wherein said shunt control signal is varied smoothly.

26. The pixel cell as in claim 16, wherein said photosensor is a photodiode.

27. The pixel cell as in claim 26, wherein said photodiode is a pinned photodiode.

28. The pixel cell as in claim 16, wherein said photosensor is a photogate.

29. A pixel cell comprising:
a reset transistor to control an amount of charge stored at a storage node;
a buffer transistor to drive an output of said pixel cell;
a photosensor to supply charge to be stored in said storage node;
a transfer transistor to selectively isolate said photosensor from said storage node; and
a shunt transistor to provide blooming protection for said photosensor.

30. The pixel cell as in claim 29, wherein said reset transistor and said shunt transistor are the same transistor.

31. The pixel cell as in claim 29, further including an output control transistor to control an output of said pixel cell.

32. The pixel cell as in claim 29, wherein a conduction state of said reset transistor is controlled by a time-varying signal.

33. The pixel cell as in claim 29, wherein said reset transistor is operated in a sub-threshold state during an integration period.

34. The pixel cell as in claim 29, wherein:
said reset transistor is operated in a conduction state during a pre-charging period; and
said reset transistor is placed in a non-conduction state after an integration period.

35. The pixel cell as in claim 29, wherein said transfer transistor is operated in a conduction state during a pre-charging period.

36. The pixel cell as in claim 29, wherein said transfer transistor is operated in a non-conduction state during an integration period.

37. The pixel cell as in claim 29, wherein:
said transfer transistor is operated in a conduction state to allow transfer of charge from said photosensor to said floating node during a transfer period; and
said transfer transistor is placed in a non-conduction state after said transfer period.

38. The pixel cell as in claim 29, wherein:
said a conduction state of said shunt transistor is controlled by a shunt control signal; and
wherein said shunt control signal is a time-varying signal.

39. The pixel cell as in claim 38, wherein said shunt control voltage is decreased from a maximum value to a lesser value over an integration period.

40. The pixel cell as in claim 38, wherein said shunt control signal is varied in discrete steps.

41. The pixel cell as in claim 38, wherein said shunt control signal is varied smoothly.

42. The pixel cell as in claim 29, wherein said shunt control signal places said shunt transistor in a conduction state during a readout period.

43. The pixel cell as in claim 29, wherein said photosensor is a photodiode.

44. The pixel cell as in claim 43, wherein said photodiode is a pinned photodiode.

45. The pixel cell as in claim 29, wherein said photosensor is a photogate.

46. An imaging System comprising:
an array of pixel cells having outputs coupled to a column select line, each of said pixel cells including:
a reset transistor to control an amount of charge stored at a storage node;
a buffer transistor to drive an output of said pixel cell;
a photosensor to supply charge to be stored in said storage node;
a transfer transistor to selectively isolate said photosensor from said storage node; and
a shunt transistor to provide blooming protection for said photosensor.

47. The imaging system as in claim 46, wherein said reset transistor and said shunt transistor are the same transistor.

48. The imaging system as in claim 46, wherein said pixel cells further include an output control transistor to control an output of said pixel cell.

49. The imaging system as in claim 46, wherein a conduction state of said reset transistor is controlled by a time-varying signal.

50. The imaging system as in claim 46, wherein said reset transistor is operated in a sub-threshold state during an integration period.

51. The imaging system as in claim 46, wherein:
said reset transistor is operated in a conduction state during a pre-charging period; and
said reset transistor is placed in a non-conduction state after an integration period.

52. The imaging system as in claim 46, wherein said transfer transistor is operated in a conduction state during a pre-charging period.

53. The imaging system as in claim 46, wherein said transfer transistor is operated in a non-conduction state during an integration period.

54. The imaging system as in claim 46, wherein:

said transfer transistor is operated in a conduction state to allow transfer of charge from said photosensor to said floating node during a transfer period; and said transfer transistor is placed in a non-conduction state after said transfer period.

55. The imaging system as in claim 46, wherein:

said a conduction state of said shunt transistor is controlled by a shunt control signal; and wherein said shunt control signal is a time-varying signal.

56. The imaging system as in claim 55, wherein said shunt control voltage is decreased from a maximum value to a lesser value over an integration period.

57. The imaging system as in claim 55, wherein said shunt control signal is varied in discrete steps.

58. The imaging system as in claim 55, wherein said shunt control signal is varied smoothly.

59. The imaging system as in claim 46, wherein said shunt control signal places said shunt transistor in a conduction state during a readout period.

60. The imaging system as in claim 46, wherein said photosensor is a photodiode.

61. The imaging system as in claim 60, wherein said photodiode is a pinned photodiode.

62. The imaging system as in claim 46, wherein said photosensor is a photogate.

63. A method for providing blooming protection in a pixel cell, the method comprising the steps of:

pre-charging a storage node;

providing charge to be stored in the storage node using a photosensor;

limiting an amount of charge stored in the storage node by applying a variable bias voltage to a transistor coupled between the storage node and a voltage supply; and shunting excess charge generated by the photosensor through a transistor coupled between the photosensor and the voltage supply.

64. The method as in claim 63, wherein the step of limiting an amount of charge stored in the storage mode includes operating a reset transistor in a subthreshold state during an integration period.

65. The method as in claim 63, wherein the step of limiting an amount of charge stored in the storage mode includes applying the variable bias voltage to a shunt transistor.

66. The method as in claim 65, wherein the variable bias voltage is decreased from a maximum value to a lesser value over an integration period.

67. The method as in claim 65, wherein the variable bias voltage is varied in discrete steps.

68. The method as in claim 65, wherein the variable bias voltage is varied smoothly.

69. The method as in claim 63, wherein the step of pre-charging includes:

operating a reset transistor in a conduction state during a pre-charging period; and placing the reset transistor in a non-conduction state after an integration period.

70. The method as in claim 63, wherein the step of pre-charging includes operating a transfer transistor in a conduction state during a pre-charging period.

71. The method as in claim 63, wherein the step of pre-charging includes operating a transfer transistor in a non-conduction state during an integration period.

72. The method as in claim 63, wherein the step of providing charge to be stored includes:

operating a transfer transistor in a conduction state to allow transfer of charge from the photosensor to the floating node during a transfer period; and placing the transfer transistor in a non-conduction state after the transfer period.

73. The method as in claim 63, wherein the step of shunting includes operating a shunt transistor in a conduction state during a readout period.

74. The method as in claim 63, wherein the photosensor is a photodiode.

75. The method as in claim 74, wherein the photodiode is a pinned photodiode.

76. The pixel cell as in claim 63, wherein the photosensor is a photogate.

* * * * *